United States Patent [19]

Crane

[11] Patent Number: 4,511,205
[45] Date of Patent: Apr. 16, 1985

[54] SCANNING SYSTEM WHEREIN THE SCANNING BEAM ROTATES AND TRANSLATES

[75] Inventor: Joseph J. Crane, Woodbridge, Va.

[73] Assignee: Crossfield Data Systems, Inc., Springfield, Va.

[21] Appl. No.: 383,928

[22] Filed: Jun. 2, 1982

[51] Int. Cl.³ ............................................. G02B 27/17
[52] U.S. Cl. ...................................... 350/6.1; 350/6.5
[58] Field of Search ................................. 350/6.1, 6.5

[56] References Cited

U.S. PATENT DOCUMENTS

| | | |
|---|---|---|
| 529,300 | 11/1894 | O'Neill . |
| 2,413,400 | 12/1946 | Young . |
| 3,651,256 | 3/1972 | Sherman et al. . |
| 3,875,587 | 4/1975 | Pugsley . |
| 3,938,191 | 2/1976 | Jarmy . |
| 3,949,159 | 4/1976 | Ricards et al. . |
| 4,054,928 | 10/1977 | Butler et al. . |
| 4,131,916 | 12/1978 | Landsman . |
| 4,135,212 | 1/1979 | Pugsley et al. . |
| 4,139,243 | 2/1979 | Landsman . |
| 4,327,380 | 4/1982 | Yamada et al. . |

OTHER PUBLICATIONS

Catalog sheet describing Fairchild Model T5100 series I/P and E/P Transducers (2 sheets).
Catalog sheet for M83 Series Motor/Driver produced by Compumotor Corporation, 1310 Ross Street, Petaluma, CA 94952.
Catalog sheets for Air Bearing Slides known as Pneumo-Linear Slides, Manufactured by Pneumo Precision, Inc., Precision Park, Keene, NH 03431, (4 sheets).
Bulletin No. 580, Dover Instrument Corp., P.O. Box 100, 5 Walkup Drive, Westboro, Mass. 01581 (1 sheet).
"Dover Air Bearings", Dover Instrument Corp., P.O. Box 100, 5 Walkup Drive, Westboro, Mass. 01581 (1 sheet).

Primary Examiner—John K. Corbin
Assistant Examiner—Rebecca D. Gass
Attorney, Agent, or Firm—William D. Hall

[57] ABSTRACT

Apparatus for both rotating and translating a scanning mirror is provided. The mirror is carried by a hollow shaft which is rotated by air under pressure. Such air is fed into the hollow cavity in the shaft and escapes through a turbine which is a part of the shaft. The turbine rotates the shaft. The shaft is supported by air bearings from a surrounding housing. That housing is supported by a slide which is pneumatically supported from a stationary rail. The slide is translated parallel to the axis of the shaft by a lead screw driven by a stepping motor. The lead screw cooperates with a lead screw nut which is affixed to said slide. The aforesaid arrangement provides great accuracy and minimum instability during the scanning operation.

4 Claims, 6 Drawing Figures

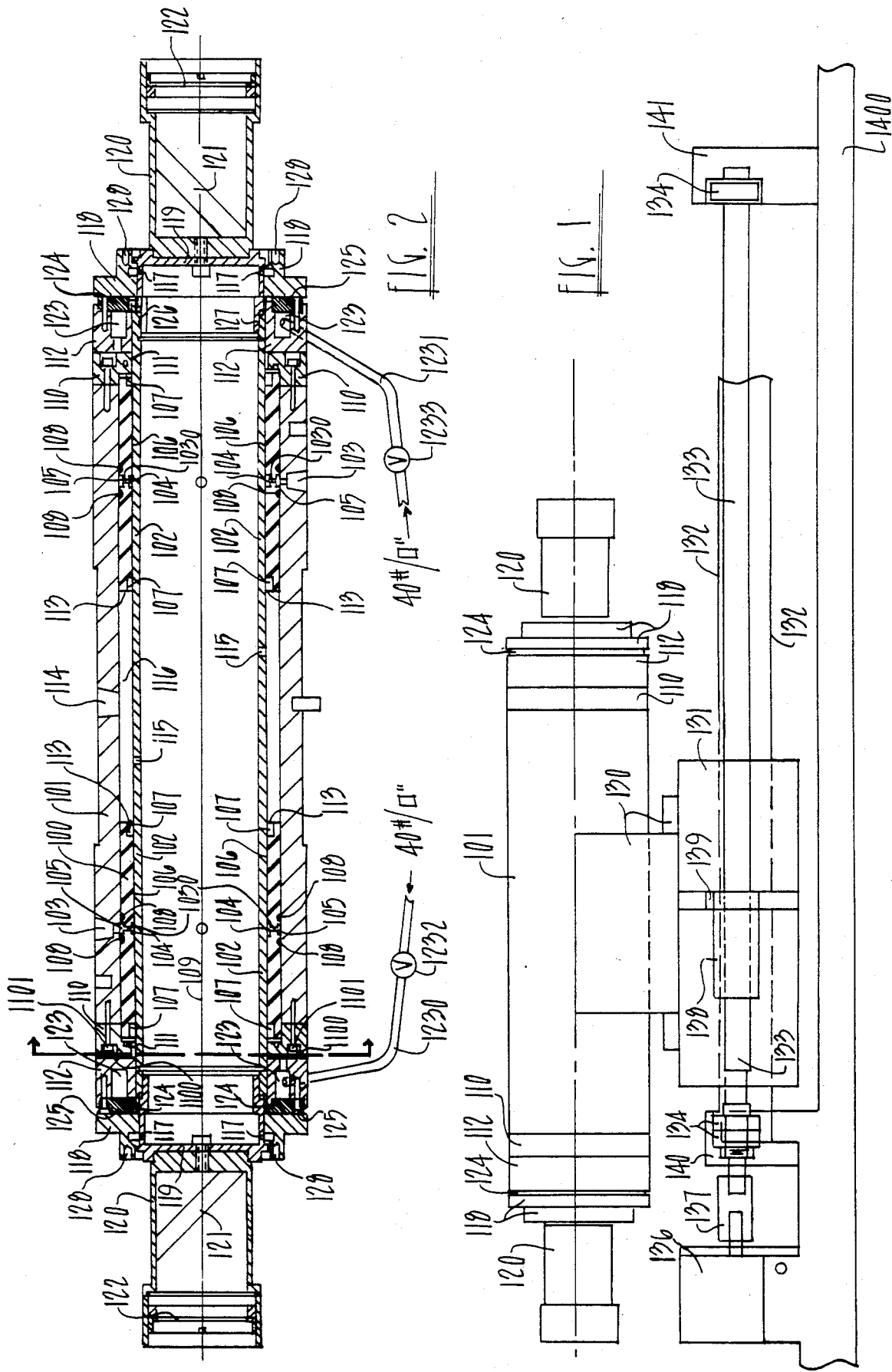

SCANNING SYSTEM WHEREIN THE SCANNING BEAM ROTATES AND TRANSLATES

TECHNICAL FIELD

This invention relates to scanning systems and is particularly useful in connection with scanning systems for reading and/or writing with laser beams in connection with the making of printing plates. For example, one application of the invention would be reading a paste-up representing a page of a newspaper. Another application is the making of printing plates. Similarly, laser masks may be made from which a multiplicity of printing plates may be made.

BACKGROUND ART

Scanning systems using laser beams for reading and/or writing are well known. For example, U.S Pat. No. 4,131,916 to Robert H. Landsman, which issued Dec. 26, 1981, entitled Pneumatically Actuated Image Scanning Reader/Writer, shows a pair of mirrors mounted at opposite ends of a rotating shaft. The shaft is hollow, is mounted on air bearings, and is rotated by air that is fed into the hollow portion of the shaft and is exhausted through inclined portholes in the rotating shaft. The discharge of air through these inclined portholes rotates the shaft. The scanning action of Landsman involved both rotation and translation of the shaft. To effect translation, the said Landsman patent employed a differential air pressure system as a part of the rotating shaft.

DISCLOSURE OF INVENTION

In accordance with the present invention, there is also a hollow rotating shaft. Air under pressure is fed into the cavity in the shaft and escapes through one of more turbines to rotate the shaft.

The rotating shaft is mounted on air bearings, and air pressure that passes the seal at one end of the bearings is vented to the ambient atmosphere.

An improved means for translating the scanning system is provided. The housing for said rotating shaft is mounted on a block which is supported on a slide bar by air under pressure. A lead screw, driven by a stepping motor, cooperates with an internally-threaded member connected to said block, translates the rotating shaft along its axis.

BRIEF DESCRIPTION OF THE DRAWINGS

FIG. 1 is a side view of the invention.

FIG. 2 is a cross-section of the rotating scanning element and the stationary housing therefor.

BEST MODE FOR CARRYING OUT THE INVENTION

Figure 3:
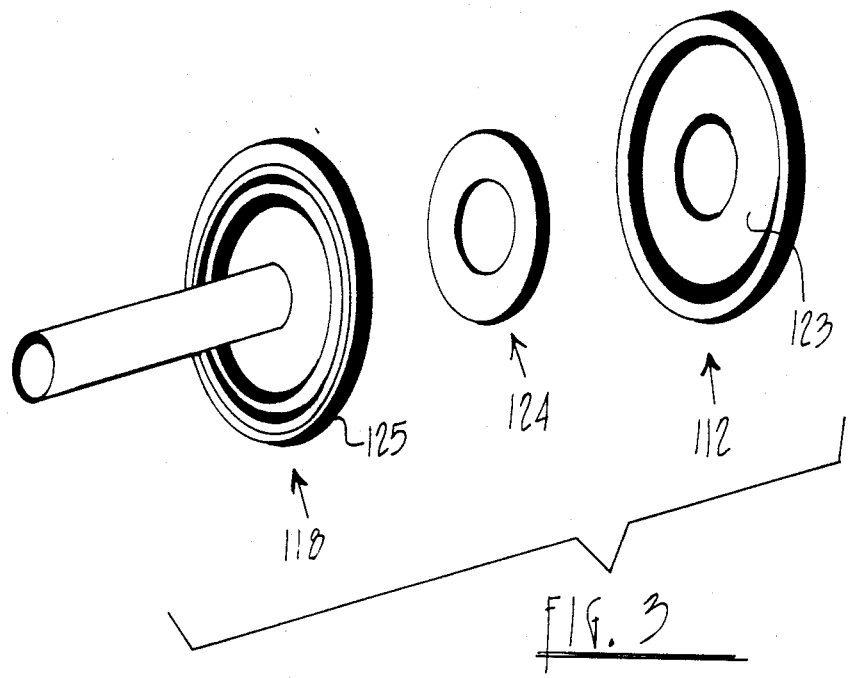
FIG. 3 is a detail view of a portion (112) of the housing, a porous bronze plate (124), and the turbine (118) having a flat sidewall (125).

The present invention is an improvement upon the scanning system of said Landsman U.S. Pat. No. 4,131,916; and the present invention simply provides improved apparatus for translating and rotating the scanning mirrors.

The bearing (100) is supported by the housing (101) which, as will be seen, moves laterally and parallel to the material to be scanned, but does not rotate about the axis (109) of FIG. 2. The shaft (102) rotates with reference to the bearing (100) and the housing (101) around the axis (109). Air under pressure between 70 and 100 pounds per square inch is connected to input (103) and enters annular slot (105) which completely encircles the outer portion of bearing (100). The air under pressure from slot (105) enters annular trough (104) to thus provide an air bearing surface between the rotating shaft (102) and the bearing (100). This air space (106), between bearing (100) and shaft (102), is approximately 0.0008 inches wide. The O rings (108) prevent leaking of the air passing inlet (103) to the annular groove (104). The cap (110) is connected to the housing (101) and has a vent (111) which feeds hole (1110) (FIG. 6) whereby air which flows past ring (107) is vented to the atmosphere. Some air from space (106) also passes ring (107) to space (113) which is at lower pressure, as will be seen, than the pressure in the gap between ring (107) and shaft (102).

Air under pressure from a servo mechanism that controls the air pressure (see part 142 in FIG. 5) enters inlet (114) and then via space (116) to air ports (115) and then through the ports (117) to drive the turbines (118). The turbines (118) rotate the endplates (119) which, in turn, rotate optical housings (120) which respectively carry the mirrors (121) and the lens (122). Both mirrors (121) and both lenses (122) therefore rotate at the same speed as the turbines (118). The air flows through the space (106) between the bearing (100) and shaft (102) and exits the bearing through the gap provided by rings (107) which are of cylindrical shape and are preferably made of a material known as Vespel, manufactured by DuPont. The gaps between the rings (107) and shaft (102) are typically between 0.0001 and 0.0004 inches.

Air under pressure at about 40 pounds per square inch is also fed into the annular groove (123) from which air under pressure flows through the bronze porous plate (124) and applies pressure to the flat inner surface (125) of the turbine (118). An air gap of approximately 0.002 to 0.005 inches is provided between the porous plate (124) and the flat plate which comprises the inner end surface (125) of the turbine (118).

Heretofore, devices with rotary air bearings have been used, not only in connection with scanning devices of the general class involved here, but also in other applications. One problem that has arisen in connection with such air bearings is that there is unwanted lateral movement between the housing and the rotating part. Such unwanted lateral movement is very objectionable in the case of a scanning device of the character involved here because any lateral error in the position of the mirrors (121) will cause an error in the materials being read and/or printed, as the case may be. This lateral movement which causes such error is avoided, by reason of the porous bronze block (124) at both ends of the device. Air under pressure enters the annular cavities (123), both at the right end of the device via feed line (1230) and at the left end of the device via feed line (1231), and passes through the porous bronze plates (124) and applies pressures on the flat surfaces (125) of the turbines (118) (see FIG. 3).

With reference to FIG. 2, the air under pressure to cavity (123) on the left side of the machine is preferably separately regulated from the air pressure entering cavity (123) on the right hand side of the machine, and if this is not done, instability may result. By trial and error, the correct pressures for the two cavities (123) are selected using two pressure regulators (1232) and (1233) (FIG. 2). The two pressures are adjusted to achieve maximum stability.

The end plate (119) is attached to the shaft (102) by threads. The inner surface of shaft (102) is threaded along surface (126) and the outer surface of the ring (127) attached to end plate (119) is threaded. The mating threads between the inner surface of shaft (102) and the outer surface (127), hold the end plate (119) to the shaft (102).

Figure 5:
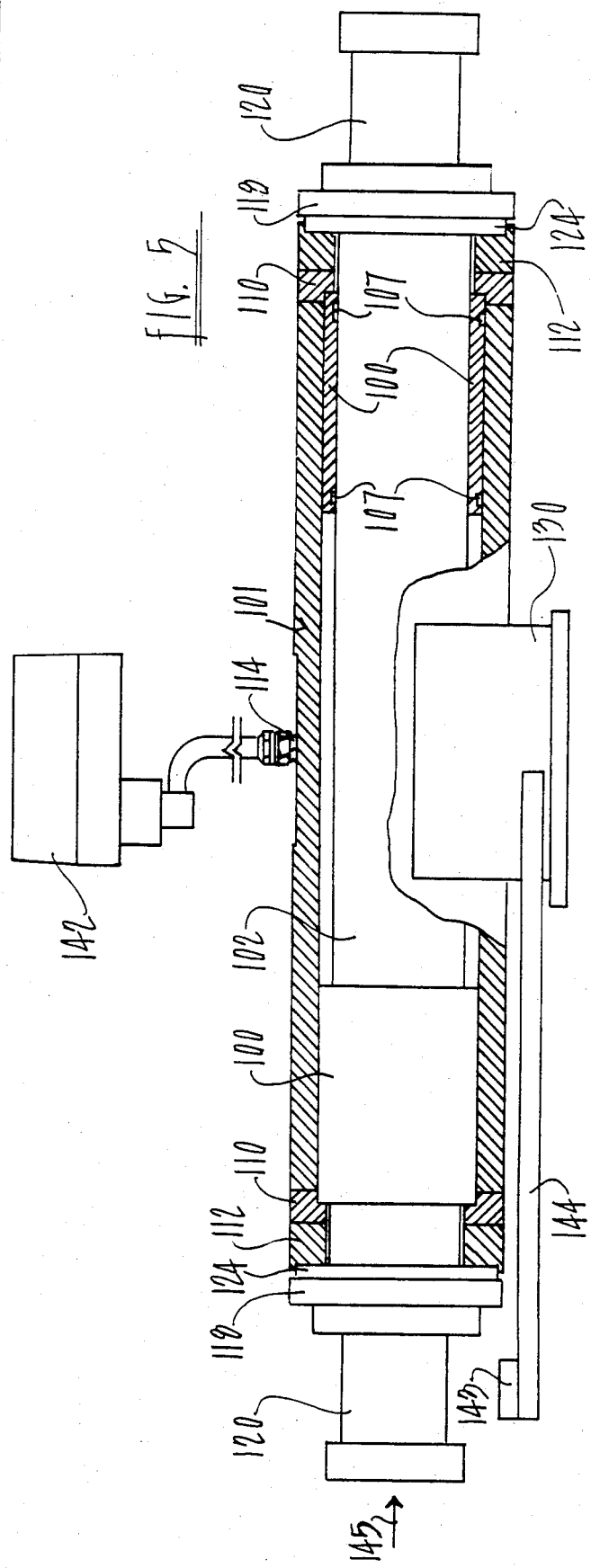
FIG. 5 is a side view of the rotating system with a portion being a cross-sectional view.

The current-pressure transducer (142) may be Fairchild Series T5100 manufactured by Fairchild Industrial Products Division, 1501 Fairchild Drive, Winston Salem, N.C. (FIG. 5). Preferably this apparatus is catalog number T5120-1, having an input impedance of 2,340 ohms and an input range 1 to 5 milliamperes. This transducer controls the air pressure to inlet (114) and holds that pressure at approximately 40 pounds per square inch as previously explained.

Tapped holes, such as (128), may be placed in the ends of plates (119). Set screws may be inserted (or omitted) in these holes. The size and placement of the set screws may be selected to precisely balance the rotating mechanism dynamically.

FIG. 3 is an exploded view of the details of the manifold (112), the bronze porous plate (124) and the end plate (125) of the turbine (118).

Figure 6:
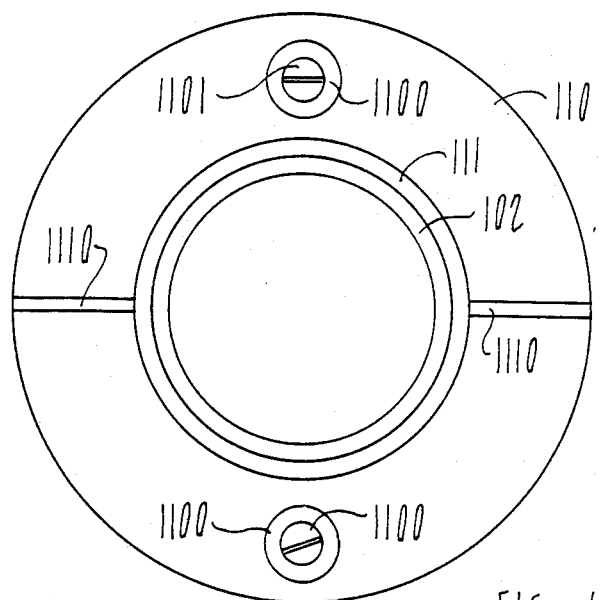
FIG. 6 is a cross-sectional view along line 6—6 of FIG. 2.

FIG. 6 illustrates certain details of caps (110) (FIG. 2). There are two of these caps (110), one at each end of the rotating apparatus of FIG. 2. While only the details of the left cap (110) are shown in FIG. 6, it is understood that the right hand cap (110) (FIG. 2) has similar details. The cap (110) has a borehole (1100) through which bolt (1101) passes to fasten the cap (110) securely to housing (101).

One desirable feature shown in FIG. 6 is that there are air bleed holes (1110) extending from vent (111) to the ambient atmosphere to thus allow release of the air under pressure that passed the outermost rings (107) into vent (111).

FIG. 1 shows the supporting mechanism for the apparatus shown in FIG. 2 and also moves the apparatus shown in FIG. 2 laterally for the purpose of providing the lateral component of the scanning motion. The scanning motion obviously has, in addition to the lateral movement, a rotating movement which has already been described. The housing (101) originally explained in connection with FIG. 2 and which is also shown in FIG. 1 is supported by the cradle (130). The cradle (130) is mounted on the pneumo-linear slide (131). This slide (131) is manufactured by Pneumo Precision, Inc., Precision Park, Keene, N.H.; and, together with its supporting rail (132), is an established and well known supporting element. The slide (131) is supported by air pressure from the railing (132) which is also manufactured by said Pneumo Precision, Inc., as aforesaid.

In other words, the stationary rail (132) supports the slide (131), and the support function between (131) and (132) is by means of air pressure. The slide (131), in turn, supports the cradle (130) which, in turn, supports the housing (101).

Running parallel to, and along side of, the supporting element (131), and the rail (132), is a lead screw (133) which is supported by three bearings (134) and which is prevented from unwanted lateral movement by collar (135). The lead screw (133) is rotated by stepping motor (136) which is connected to the lead screw (133) by the coupler (137).

The stepping motor (136) (FIG. 3) may be model M83-62 series, motor/driver, manufactured by Compumotor Corporation, 1310 Ross Street, Petaluma, Calif. This stepping motor (136) has 25,000 steps per revolution, and a preferred speed of approximately 1 revolution per second when driving a 10 pitch lead screw. Using a 10 pitch lead screw (133), the apparatus of FIG. 2 scans approximately 1,000 lines per inch during reading and/or writing. Following the scanning of a complete page, the stepping motor runs in reverse at a speed of approximately 6 revolutions per second in order to return the apparatus of FIG. 2 to its starting position for a new scan.

The preferred speed for the turbine (118) is 6,000 rpm whereby the mirrors rotate at that speed during scanning.

Figure 4:
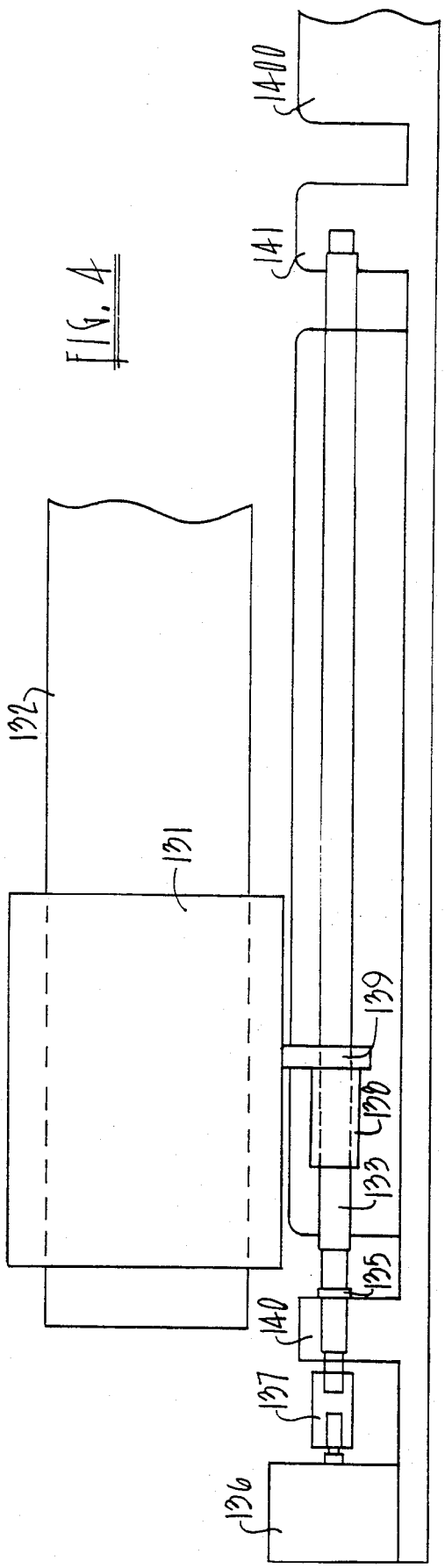
FIG. 4 is a top view of the apparatus for translating the rotating scanning element.

FIG. 4 is a top view of FIG. 1. In FIG. 4, the stepping motor (136) drives the coupler (137) which, in turn, drives the lead screw (133) which cooperates with the lead screw nut (138) (FIG. 1) which is held in fixed relation to the apparatus of FIG. 2 by bracket (139). The lead screw bearings are supported by support blocks (140) and (141). The bracket (139) is firmly attached to the support (131) which is carried by the rail (132) by air pressure as explained heretofore. The apparatus of FIGS. 1 and 4 rests on base (1400).

FIG. 5 is another view of the device of FIG. 2 showing certain additional details. A laser beam (145) is shown entering the left end of the apparatus where it is focused on the material to be read by the lens (122) via the mirror (121). As the mirror rotates about the axis (109) (FIG. 2), the laser beam is reflected to provide scanning. This beam intermittently and periodically passes encoding device (143) which emits one signal pulse for each revolution of the mirror (121). The pulses may be used for counting, synchronizing or the like. The encoder apparatus (143) is supported by bracket (144) from the cradle (130) which is more fully shown and explained in connection with FIG. 1.

The stepping motor (136) is a species of synchronous motors. It is necessary, in some applications, to be able to keep track of the exact point along the linear scanning operation as to where scanning is to start. A synchronous or stepping motor enables this to be done by counting the cycles or pulses fed to the motor.

The foregoing apparatus, therefore, provides means for both rotating and translating the scanning mirrors (121) to provide a desired scanning operation.

I claim to have invented:

1. In a scanning system of the type having a mirror that both rotates and translates for receiving a beam of light and reflecting it to provide scanning;
   a mirror,
   a shaft supporting said mirror, said shaft having an axis of rotation, and defining a cavity,
   said shaft including turbine means for rotating the shaft, said turbine means receiving air from said cavity and exhausting it to the ambient atmosphere whereby to drive the turbine means and rotate the shaft,
   the plane of the mirror being at an angle, different from perpendicular to the axis of said shaft,
   a housing for said shaft, air bearing means supporting said shaft from said housing, an elongated stationary rail extending parallel to said axis, slide means supported by air pressure from said rail, a lead screw extending parallel to said axis, said slide means having a lead screw nut connected thereto, said lead screw nut cooperating with said lead screw to move the slide means along the rail when the lead screw is rotated, and a motor for rotating the lead screw to thereby translate said lead screw nut, said slide, said housing, said shaft, and said mirror, while the shaft and mirror are being rotated by said turbine means, whereby the mirror both rotates and translates to provide scanning.

2. In a scanning system as defined by claim 1, said air bearing means defining an airspace between said shaft and said housing, said airspace having an air inlet for receiving air under pressure, said shaft and said housing defining a first vent space between them for receiving air that escapes from said airspace, and a passage through the housing and connecting the first vent space to the ambient atmosphere.

3. In a scanning system as defined in claim 2, said motor being a synchronous motor.

4. In a scanning system as defined in claim 1, said motor being a synchronous motor.

* * * * *